(12) United States Patent
Damstra et al.

(10) Patent No.: US 11,849,244 B2
(45) Date of Patent: Dec. 19, 2023

(54) SYSTEM AND METHOD FOR TEMPORAL KEYING IN A CAMERA

(71) Applicant: Grass Valley Canada, Montreal (CA)

(72) Inventors: Klaas Jan Damstra, Breda (NL); Marcel Koutstaal, Breda (NL)

(73) Assignee: GRASS VALLEY CANADA, Montreal (CA)

( * ) Notice: Subject to any disclaimer, the term of this patent is extended or adjusted under 35 U.S.C. 154(b) by 0 days.

(21) Appl. No.: 17/813,230

(22) Filed: Jul. 18, 2022

(65) Prior Publication Data

US 2023/0028882 A1    Jan. 26, 2023

Related U.S. Application Data

(60) Provisional application No. 63/224,549, filed on Jul. 22, 2021.

(51) Int. Cl.
*H04N 5/275* (2006.01)
*H04N 7/01* (2006.01)

(52) U.S. Cl.
CPC ......... *H04N 5/275* (2013.01); *H04N 7/0127* (2013.01)

(58) Field of Classification Search
CPC ............................ H04N 5/275; H04N 7/0127
See application file for complete search history.

(56) References Cited

U.S. PATENT DOCUMENTS

| | | | |
|---|---|---|---|
| 5,282,038 A | 1/1994 | Lowe | |
| 8,125,531 B2 * | 2/2012 | Van Geel | H04N 23/63 348/211.3 |
| 8,571,388 B2 * | 10/2013 | Uchiike | H04N 7/01 386/326 |
| 11,079,912 B2 * | 8/2021 | Silberstein | G11B 27/034 |
| 11,120,836 B2 * | 9/2021 | Yamasaki | G11B 15/1875 |
| 11,140,423 B2 * | 10/2021 | Meyer | H04N 21/21805 |
| 11,172,158 B2 * | 11/2021 | Van Geel | H04N 23/90 |
| 11,316,912 B2 * | 4/2022 | Lapointe | H04L 65/75 |

(Continued)

FOREIGN PATENT DOCUMENTS

CA    3105905    1/2020

OTHER PUBLICATIONS

International Search Report and Written Opinion, dated Oct. 17, 2022, International Patent Application No. PCT/CA2022/051130, International filing date Jul. 20, 2022.

*Primary Examiner* — Brian P Yenke
(74) *Attorney, Agent, or Firm* — ARENTFOX SCHIFF LLP (57) ABSTRACT

A system is provided for capturing a key signal within video frames that includes a camera that captures a sequence of media content of a live scene that includes an electronic display having a higher frame rate than an output frame rate of the camera, and a key signal processor that convert all frames in the sequence of media content to the output frame rate of the camera, analyzes a sequence of frames to determine the key signal based on the electronic display outputting a sequence of frames including media content and at least one key frame included in the sequence, and combine remaining frames of the sequence of frames to create a live output signal. Moreover, the key signal processor determines, for each pixel in the frames, whether the pixel has a set chromaticity, and generates a key mask for each pixel in each frame.

20 Claims, 9 Drawing Sheets

(56) References Cited

U.S. PATENT DOCUMENTS

| | | | |
|---|---|---|---|
| 2002/0044683 A1* | 4/2002 | Deshpande | H04N 5/2723 |
| | | | 382/165 |
| 2004/0183949 A1* | 9/2004 | Lundberg | H04N 5/272 |
| | | | 348/587 |
| 2008/0117333 A1* | 5/2008 | Walsh | H04N 5/275 |
| | | | 348/586 |
| 2009/0087016 A1 | 4/2009 | Berestov et al. | |
| 2011/0043689 A1* | 2/2011 | Cobb | H04N 5/147 |
| | | | 348/E7.003 |
| 2011/0292288 A1* | 12/2011 | Deever | H04N 21/8549 |
| | | | 348/590 |
| 2017/0237910 A1* | 8/2017 | Salin | H04N 5/272 |
| | | | 345/634 |
| 2021/0227270 A1* | 7/2021 | Braun | H04N 21/242 |
| 2022/0400226 A1* | 12/2022 | Liang | H04N 19/132 |
| 2022/0408057 A1* | 12/2022 | Choi | H04N 7/0127 |

* cited by examiner

SYSTEM AND METHOD FOR TEMPORAL KEYING IN A CAMERA

REFERENCE TO RELATED APPLICATIONS

The current application claims priority to U.S. Patent Provisional Application No. 63/224,549, filed Jul. 22, 2021, entitled "System and Method for Temporal Keying in a Camera", the entire contents of which are hereby incorporated by reference.

TECHNICAL FIELD

The present disclosure generally relates to video and media production, and, more particularly, to a system and method for capturing a key signal—generated with high frame rate electronic displays, not visible to the viewer— within video frame.

BACKGROUND

Live television broadcasting typically involves capturing media content from a live scene (e.g., a sports venue, news broadcast, etc.), transmitting the captured content to a remote production facility where the video and audio signals are managed by production switchers, and then encoding the signals for transport to a distribution network. There are also many known systems for analyzing the captured content and inserting supplemental content in the media stream that, for example, can offer targeted advertisements based on geographical locations of the end consumers (e.g., customers). One exemplary system is described in U.S. Pat. No. 10,200,749, entitled "Method and Apparatus for Content Replacement in Live Production", issued on Feb. 5, 2019, the contents of which are hereby incorporated by reference.

Figure 1:
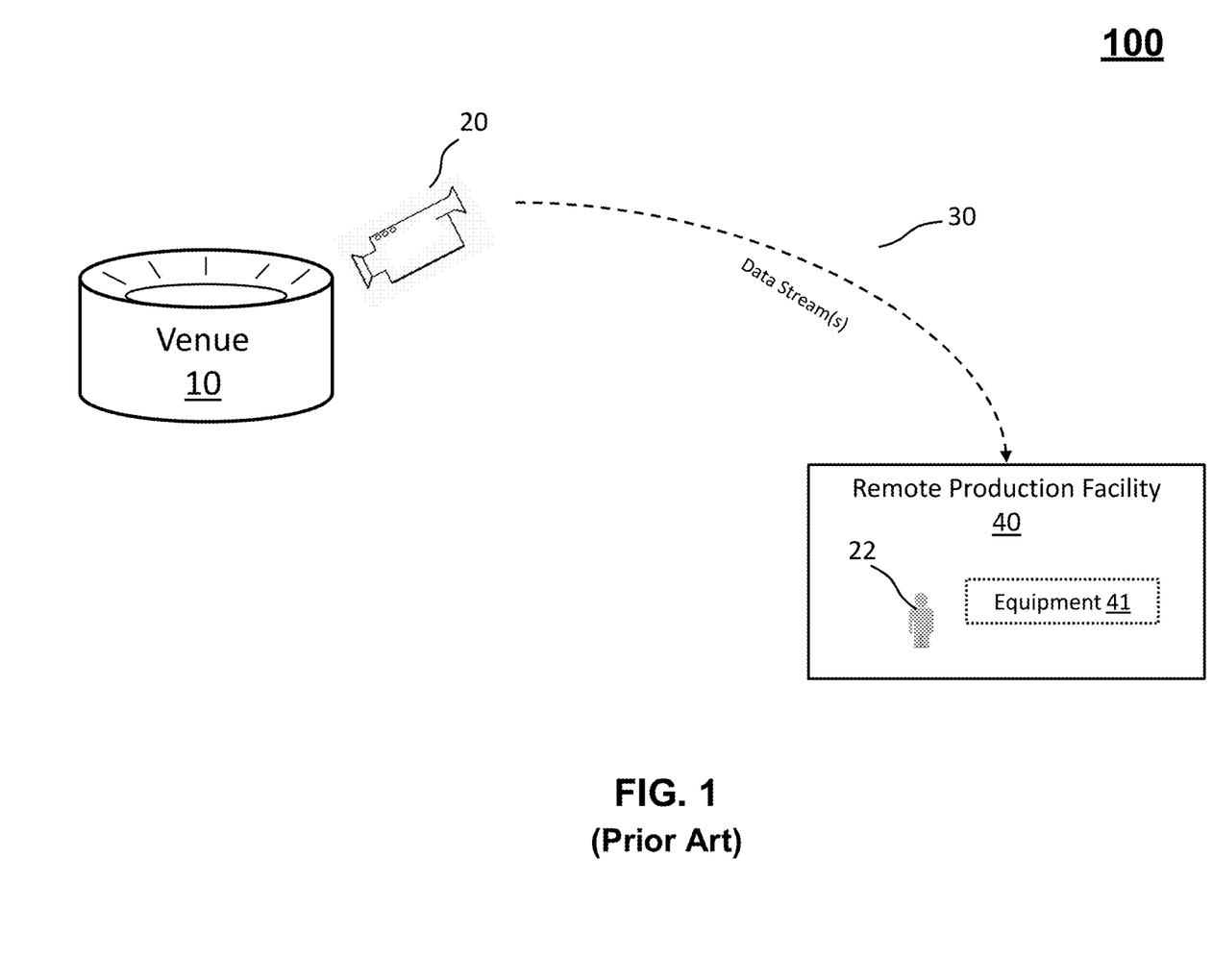
FIG. 1 illustrates a block diagram of a conventional system for producing a live television broadcast.

FIG. 1 illustrates a block diagram of a conventional system for producing a live television broadcast. As shown, the system 100 can include one or more cameras 20 that capture media content from a venue 10 (e.g., a sports venue) and provide a media or data stream 30 of the captured content. Often, an encoder will be used to encode the data streams and provide the media as contribution feeds to a remote production facility 40 using satellite communication, for example. The production facility 40 will typically include video production equipment 41 that can be composed of production switches, controllers, processors, timing modules, a codec, and other equipment provided to process the incoming media/data streams for a media broadcast production. Furthermore, a technical director 22 can be located at the remote production facility 40 to control the video switcher(s) and make editorial and artistic decisions for the video production. As also described in U.S. Pat. No. 10,200,749, the equipment 41 can include various production components, workflow managers, and the like, for modifying the content before it is distributed for broadcast.

More recently, electronic displays (e.g., electronic billboards) have been provided at live events and used on location to display content (e.g., adverts or other electronic video communication) to the audience that is actually attending the live event. Typically, the contents will also be captured by a camera (e.g., camera 20 shown in FIG. 1), of which the data stream will capture and display the content/ adverts for the viewers at home that are consuming the media production of the live event. It should be appreciated that generally, the time prerecorded content (e.g., advertisements) is displayed on the electronic displays closer to the field (or playing surface). Content of cameras (e.g., close- ups of the goal) will be shown on other displays often positioned higher than the advertisement billboards. The reason being that when billboards around the field are used to display content of the camera, while the same camera is also capturing the output of the billboard, there is a potential to create the "Droste effect".

In any event, with live events now being broadcast to all corners of the world, it is desired to better serve the different audiences (e.g., in the stadium/studio, and viewers of the broadcast at home) by displaying different advertisements and contents in the stadium/studio than the advertisements and content that is provided for broadcast for the viewers at home. That is, for the content to be displayed as different versions of the live event with different advertisements and content, for instance, to viewers in different geographical locations with localized advertisements.

Accordingly, a solution is needed to, on one hand display adverts in the stadium, and on the other hand "key in" automatically alternative content/adverts on the displays visible in the transmitted (or recorded) live streams.

Currently, proposed solutions are based on high frame rate cameras that suffer from lower sensitivity due to the nature of high frame rate cameras in combination with the inclusion of multiple advertisement streams on a high frame rate display. Different advertisement streams are thus captured by different phases of the high frame capture by the camera. Next to the lower sensitivity, a disadvantage is that the different advertisement streams are averaged in the eye of the viewer in the stadium/studio, so no proper advertisement can be shown at the venue itself.

SUMMARY

Accordingly, a system and method is disclosed herein that is provided for capturing a key-signal of a very short time-cycle of a key-screen within a camera video-frame and provide the captured key-signal as a key signal next to the regular video. Generally, the infrastructure of the system is provided at a live event (e.g., a sports game) where electronic displays are used on the location of the event that is being recorded, which are running in a frame rate that is a multiple of the frame rate that the camera(s) output. Moreover, one or more cameras are provided on the location of the event with camera tracking information that is provided by the camera system or an external solution. Finally, a graphic engine can be provided downstream and configured to insert different adverts/content on captured displays for different versions of the program that is being generated based on the identified key signals.

In an exemplary embodiment, a system and method is provided that extracts or otherwise separates one frame that contains the green display from the other frames of the captured media stream. This separated frame is converted to the normal frame rate and output together with the combined stream (that combines multiple frames to come to the normal frame rate).

In another exemplary aspect, a system is provided for capturing a key signal within video frames. Moreover, the system includes a camera configured to capture a sequence of media content of a live scene that includes an electronic display having a higher frame rate than an output frame rate of the camera; and a key signal processor in the camera that is configured to convert all frames in the sequence of media content to the output frame rate of the camera, analyze a sequence of frames of the captured media content to identify the key signal therein based on the electronic display outputting a sequence of frames including media content and at least one key frame included in the sequence, and combine remaining frames of the sequence of frames to create a live output signal.

Moreover, in another exemplary embodiment, a system is provided for capturing a key signal within video frames. In this aspect, the system includes a camera configured to capture media content of a live scene that includes an electronic display having a higher frame rate than an output frame rate of the camera. Moreover, the system includes a key signal processor configured to analyze a sequence of frames of the captured media content to identify the key signal therein. Moreover, the key signal processor includes a pixel color detector configured to determine, for each pixel in each frame in the sequence of frames, whether the pixel has a set chromaticity, and to generate a key mask for each pixel in each frame, with the key mask indicating whether the pixel comprises a key frame or video content, a gain corrector configured to correct the key-frame, and a key signal output configured to multiplex a one bit stream of the key frame in a least significant bit of a blue (Cb in YCrCb) channel, such that the key signal and video content are output as a single data stream. Alternatively, the key mask can be output as a separate stream of keybits, effectively as a metadata stream for the downstream keyer.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Certain aspects of the system for capturing a key signal within video frames will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements" or "components"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media may include transitory or non-transitory computer storage media for carrying or having computer-executable instructions or data structures stored thereon. Both transitory and non-transitory storage media may be any available media that can be accessed by a computer as part of the processing system. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Further, when information is transferred or provided over a network or another communications connection (either hardwired, wireless, or combination thereof) to a computer, the computer or processing system properly determines the connection as a transitory or non-transitory computer-readable medium, depending on the particular medium. Thus, any such connection is properly termed a computer-readable medium. Combinations of the above should also be included within the scope of the computer-readable media. Non-transitory computer-readable media excludes signals per se and the air interface.

Moreover, for purposes of this disclosure, the term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

Figure 2:
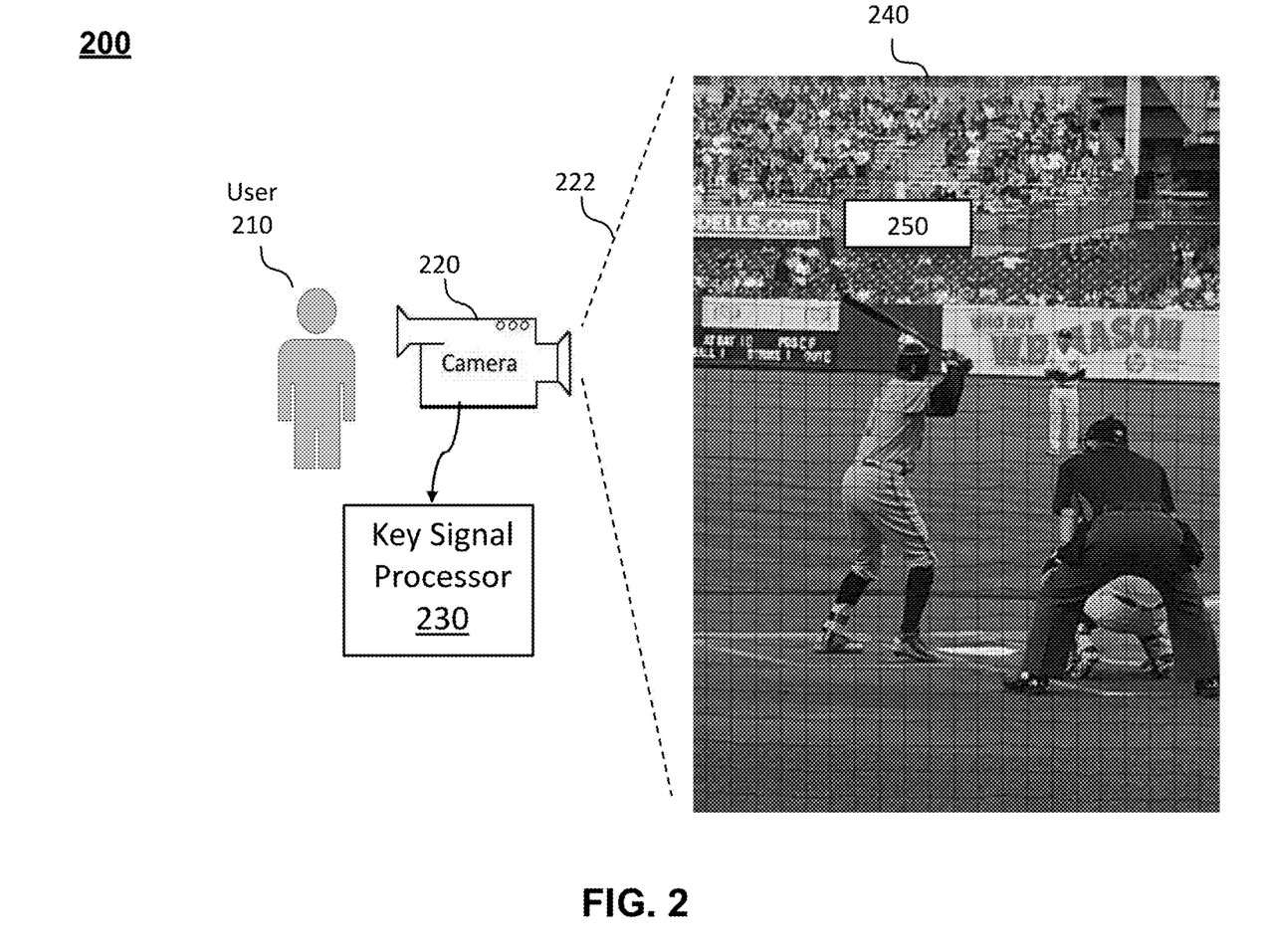
FIG. 2 illustrates a diagram of a system for capturing a key signal within video frames according to an exemplary embodiment.

FIG. 2 illustrates a diagram of a system for capturing a key signal within video frames according to an exemplary embodiment. In general, the system 200 is shown in the context of video content capture at a live sporting event, such as a baseball game (although it is noted that it can be any kind of live venue). As shown the system 200 includes a camera 220 (or a plurality of cameras) that are configured to capture media content at a venue 240, such as a sports venue. Although only one camera is shown, it should be appreciated that tens or even hundreds of media streams can be generated at the venue by various cameras, for example.

According to the exemplary embodiment, the camera 220 can be controlled by a user 210 (e.g., a camera operator located on site), although the camera 220 could also be fixed or remotely and robotically controlled, for example, in alternative aspects. As shown, the camera 220 has a field of view (FOV) 222 that is configured to capture a portion of the live event 240, which in this example is a baseball game. Moreover, the live scene 240 (e.g., at a baseball stadium) can include an electronic display 250 or bill board configured to display electronic images of media content (e.g., electronic video advertisements) that are targeting the fans attending the live sporting event. As will be described in detail below, the electronic display 250 presents a sequence of frames that include one or more frames configured as key frames that are detectable by camera 220.

In general, keying is often performed using permanent blue or green screen. Keying is a compositing effect that happens when a system takes a part of the video signal and make it transparent. The portion of the video signal can be selected based on color (e.g., blue or green screen), luminance or even a mask, for example. According to the exemplary aspect, light emitting diode (LED) displays (e.g., electronic display 250) support high frequency video content and are able to insert a short-time key-color-frame in the sequence of regular content frames. This can be done in such a way that the audience at the venue see just the regular content on these LED displays, such as electronic display 250, but the presented video sequence includes one or more key-color frames. That is, the refresh rate of the output by the electronic display 250 can be at a higher frequency than the human eye can detect (e.g., 300-400 frames per second) with only a subset being green for the key signal.

According to the exemplary aspect, the camera 220 includes a key signal processor 230 that is configured to capture the key-signal of such a very short time-cycle of a key-screen (e.g., a green screen presented on the electronic display 250) within a camera video-frame and convert the stream of these key frames to a standard frame rate before providing the converted key frames as a key signal next to the regular video. That is, and as will be described in more detail below, the video content displayed on the electronic display 250 will display a sequence of key-color frames and regular content frames at such a frequency that the key signal processor 230 processor can identify the existence and location of the electronic display 250 within the large picture of the captured content 240. The key signal will designate the specific pixels of the captured frame (i.e., a subset of pixels within the FOV 222) that correspond to the electronic display 250. In turn, this key signal can be processed downstream to insert alternative content (e.g., localized advertisements) at the location of the electronic display 250 within the large picture of the captured content 240. As a result, the individuals at the venue (e.g., the stadium) will simply see the regular content as it is targeted to those individuals. However, the subsequent media signals can be modified to replace that content displayed by the electronic display 250 with alternative contents or adverts based on the identified key signal.

Figure 3:
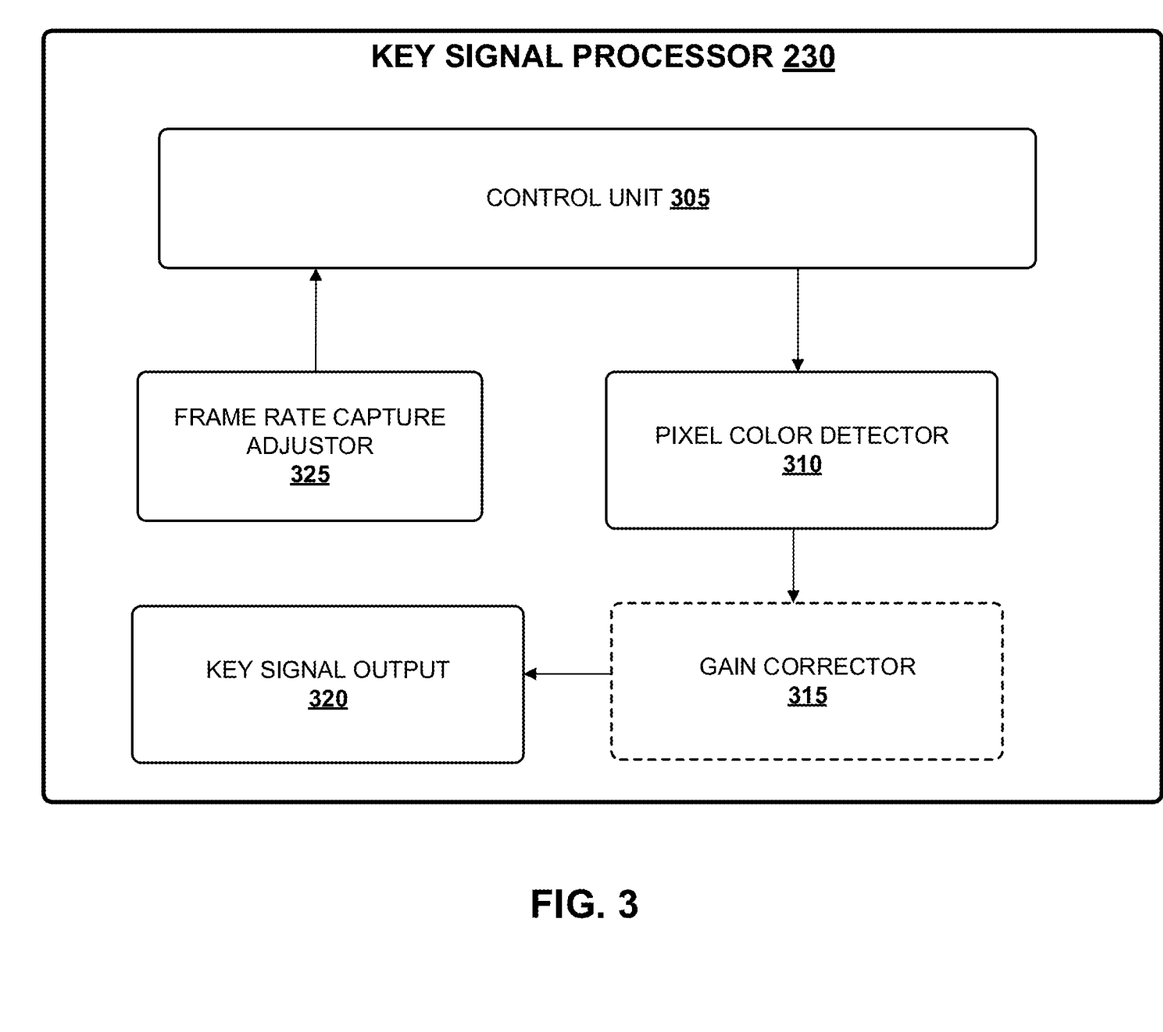
FIG. 3 illustrates a block diagram of a key signal processor of the system for capturing a key signal within video frames according to an exemplary embodiment.

FIG. 3 illustrates a block diagram of a key signal processor of the system for capturing a key signal within video frames according to an exemplary embodiment. In general, the key signal processor 230 corresponds to the key signal processor 230 of the camera 220 as described above with respect to FIG. 2. Moreover, the key signal processor 230 can be implemented using a combination of hardware and/or software components or "modules" that are configured to execute the algorithms described herein.

As shown, the key signal processor 230 includes a control unit 305 for controlling capture of the pixel data. More particularly, the control unit 305 can be configured for providing control signals used in controlling a pixel cell array of the camera 220 and outputting the captured and received pixel data to the pixel color detector 310. For example, the control unit 305 in conjunction with a row decoder can generate activating signals to activate the gates of the pixel cell array for capturing and transferring the video data. An exemplary system for image sensing of a production camera is described in U.S. Pat. No. 10,284,801, entitled "Differential Digital Double Sampling Method and CMOS Image Sensor for Performing Same", issued on May 7, 2019, the contents of which are hereby incorporated by reference. In an exemplary aspect, the control unit 305 can be configured to control and/or adjust the camera frame timing of frame capture by the pixel cell array.

Referring back to FIG. 2, to capture the live event (e.g., content 240), the camera 220 should be configured to capture the scene and the display(s) in the scene (e.g., electronic display 250) at the same frame rate and/or as a multiple that the electronic display 250 is outputting its frames of content. In other words, the output of the camera 220 should be synchronized with the electronic display 250, such that a single frame or multiple frames on the electronic display 250 exactly overlap in time with the frame(s) captured in the camera 220. For example, in a case that the camera 220 is outputting its signal at 50 Hz, the electronic display 250 should run in a multiple of 50 Hz (e.g., 300 Hz). Thus, the timing of the key-frame, both start-time and duration, can be fixed or adjusted and fits inside the normal camera frame timing to synchronize with the display frame sequence. In one aspect, this timing can be adjusted and set for the content being output by the electronic display 250, i.e., it is predetermined by the generator of the content displayed thereon.

In another exemplary aspect, the key signal processor 230 can include a frame rate capture adjustor 325 (which is shown in dashed lines as an optional component). In this aspect, the frame rate capture adjustor 325 can be configured to receive (or store) a data signal (e.g., from a remote production center) indicating the frame rate of the electronic display 250, which as noted above may be 300 Hz. In turn, the frame rate capture adjustor 325 can be configured to generate a control signal to the control unit 305 that can in turn adjust the rate of frame rate capture to ensure that the electronic display 250 is synchronized with the camera 220 as discussed above and capturing frames at the same rate or a multiple thereof that the electronic display 250 at the live venue 240 is generating its video signal.

Moreover, the frame rate capture adjustor 325 can be configured to adjust the output signal of the camera 220. For example, a conventional frame rate for an output of a camera is 50 Hz in Europe. In one exemplary aspect, the electronic display 250 may be configured to display the video content (e.g., a video advertisement at the live venue) at a frame rate of 300 Hz or higher. At 300 Hz, the electronic display 250 is effectively outputting frames at ⅓₀₀ second (i.e., every 3.3 millisecond) on the electronic display 250. In this example, the camera 220 will capture six display frames to output one camera frame (i.e., ⅕₀ second=20 millisecond) to be broadcasted to end users, for example. Accordingly, the camera 220 can be configured or otherwise controlled to capture a total sequence of six frames, and separate one frame that is configured to create a key signal (e.g., a green frame).

Moreover, since the normal output can be, for example, 50 Hz, the key signal processor 230 (e.g., frame rate capture adjustor 325) can be configured to convert the captured frame from 3.3 millisecond to 20 millisecond (i.e., as the 50 Hz output signal) by performing a timing conversion (e.g., extending the length of the frame) as would be appreciated to one skilled in the art. This output signal can be transmitted (e.g., as a separate metadata stream) to a downstream keyer. In turn, this separate signal enables a keyer to create a key and replace the green (i.e., the subset of pixels corresponding to the position of the electronic display 250 within the FOV 222) by a frame of a selected advertisement/content that has to be added to the broadcasted stream.

It should be appreciated that in alternative aspects, variable frame times can be used. For example, instead of adjusting the exposure time in one frame to integrate only the time that the display is green, the key signal processor 230 can also be configured to generate a sequence in which one frame time is shorter than the other frame times.

Figure 4:
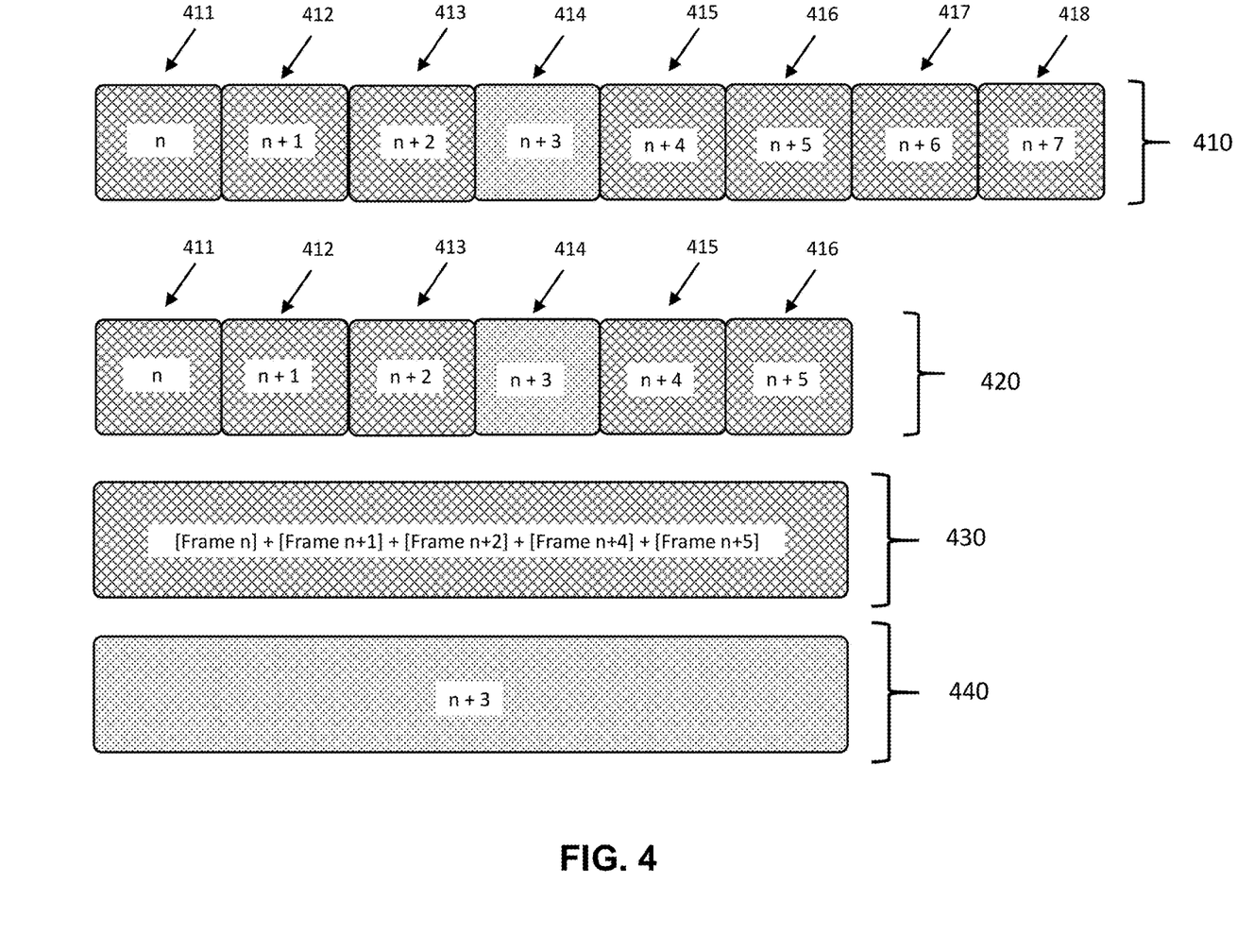
FIG. 4 illustrates a sequence of frames provided by the electronic display used in the system for capturing a key signal within video frames according to an exemplary embodiment.

FIG. 4 illustrates a sequence for a captured frame provided by the electronic display 250 used in the system for capturing a key signal within video frames according to an exemplary embodiment. As shown, the sequence 410 corresponds to an image capture sequence captured by the image sensor of camera 220, for example.

As shown, the sequence 410 includes an exemplary sequence of frames 411-418 (e.g., frame n to frame n+7) that is generated and displayed by electronic display 250 (e.g., during the live sporting event) and that can include multiple types of frames. In the exemplary aspect, the frames with the cross hatching (i.e., frames 411-413 and 415-418) correspond to the normal video content, which in this example can be a video advertisement to the audience physically located at the actual venue. Moreover, frame 414 with this stippling hatching corresponds to the green frame (e.g., a green flash). Preferably and for optimal performance, the green frame is positioned in the middle of the sequence 410, so the green frame is best positioned taking into account motion of the normal video content signal and the key signal is optimally aligned in time with output that combines frames to 50 Hz. Moreover, in an exemplary aspect, compensating frames can be included in the sequence 410 to offset the color of the green frame, although such compensating frames are not required for purposes of this disclosure and not shown in sequence 410. As will be discussed below, the key signal processor 230 is configured to detect this key signal (i.e., green frame 414) even though the audience only sees the regular video content as described above due to the frequency of the signal.

Sequence 420 illustrates an output sequence (e.g., of six frames) that is output from the internal memory for the image sensor of the camera 220, such as internal DDR memory described in U.S. Pat. No. 10,284,801 as noted above and incorporated by reference. In such cameras as described therein, the camera will output six frames with each frame having been integrated over 3.3 msec (e.g., in case of full exposure). Moreover, each frame has its own processing channel inside the camera, which means that internally, the camera processes six "normal frame rate streams" in parallel. In a slow motion camera, the camera processor generates a combined live output, which is the addition of these six streams. However, in an exemplary aspect of the system disclosed herein, the key signal processor 230 takes advantage of this configuration such that the six frames are combined as shown for sequence 420, but the independent phases are not made available except for the key frame (e.g., green frame 414). Advantageously, the system is not a slow motion system, but by adding the individual phases, the output signals hardly lose any sensitivity despite the fact that the image capture is done at a higher frame rate.

As further shown, the key signal processor 230 is configured to generate two output signals, although these output signals can ultimately be multiplexed as a single output stream in one aspect. The first signal 430 corresponds to the normal video content displayed by the electronic display 250. In particular, the output signal 430 is a combined signal that includes frames n, n+1, n+2, n+4 and n+5. Moreover, the key signal processor 230 may be configured to perform a timing adjustment or conversion to ensure the output signal is converted to the normal rate of the camera, e.g., 50 Hz or 20 milliseconds per frame.

In addition, the second signal 440 corresponds to the key mask or key signal that is of the identified green flash (e.g., 3 millisecond green flash 414) generated by the electronic display that is detectable by the key signal processor 230, but not perceptible by the viewers at the stadium as discussed above. This signal 440 can be provided, as a metadata stream, for example, to enable the downstream processing that includes advertisement replacement.

Referring back to FIG. 3, the key signal processor 230 also can include a pixel color detector 310 that is configured to dynamically detect the key signal included in the captured signal of the live event, such as live event 240 that includes the display of electronic display 250 with the green frames as discussed above. In this implementation, the key signal (e.g., green) is processed with pixel color detector 310 (e.g., an internal color detection circuit) that determines for each pixel in the captured frame whether the pixel value has a certain chromaticity, and outputs the decision as a key mask (e.g., key mask 440 discussed above) for each pixel as a "0"

or a "1". In particular, a "1" means that the key signal is "green" and a "0" means that the key signal is not "green" and is thus regular video content, such as the regular video content displayed on display 250. Thus, for each pixel in the normal output stream, pixel color detector 310 determines one additional bit indicating the video (pixel) can be replaced by the video (pixel) of the alternative advertisement/content.

Moreover, in one aspect, a key signal output 320 can be configured to multiplex this one bit stream in the least significant bit of the blue (Cb in YCrCb) channel, as the LSB of the blue channel only contains noise. This way, the camera 220 has to output only one stream by key signal output 320 to the production environment. In general, it is also noted that the chromaticity level or threshold can be predetermined for detecting the key signal. Thus, the green flash can be of a different chromaticity level than, for example, green grass on the field, and the pixel color detector 310 can be preconfigured to determine between the two for purposes of generating the key mask.

As further shown, a gain corrector 315 can be provided in a refinement of the exemplary aspect. It is shown in dashed lines as an optional component. In the camera 220, both the live frame as well as the key-frame are processed as normally done in a regular camera. However, the gain corrector 315 can be configured to correct the key-frame captured at a reduced exposure time by gain for the reduced video-level, due to its short exposure, and can be utilized to generate an in-camera key-signal using a color detection circuitry. The gain corrector 315 can be a separate component or alternative be included in the pixel color detector 310, for example.

Figure 5A:
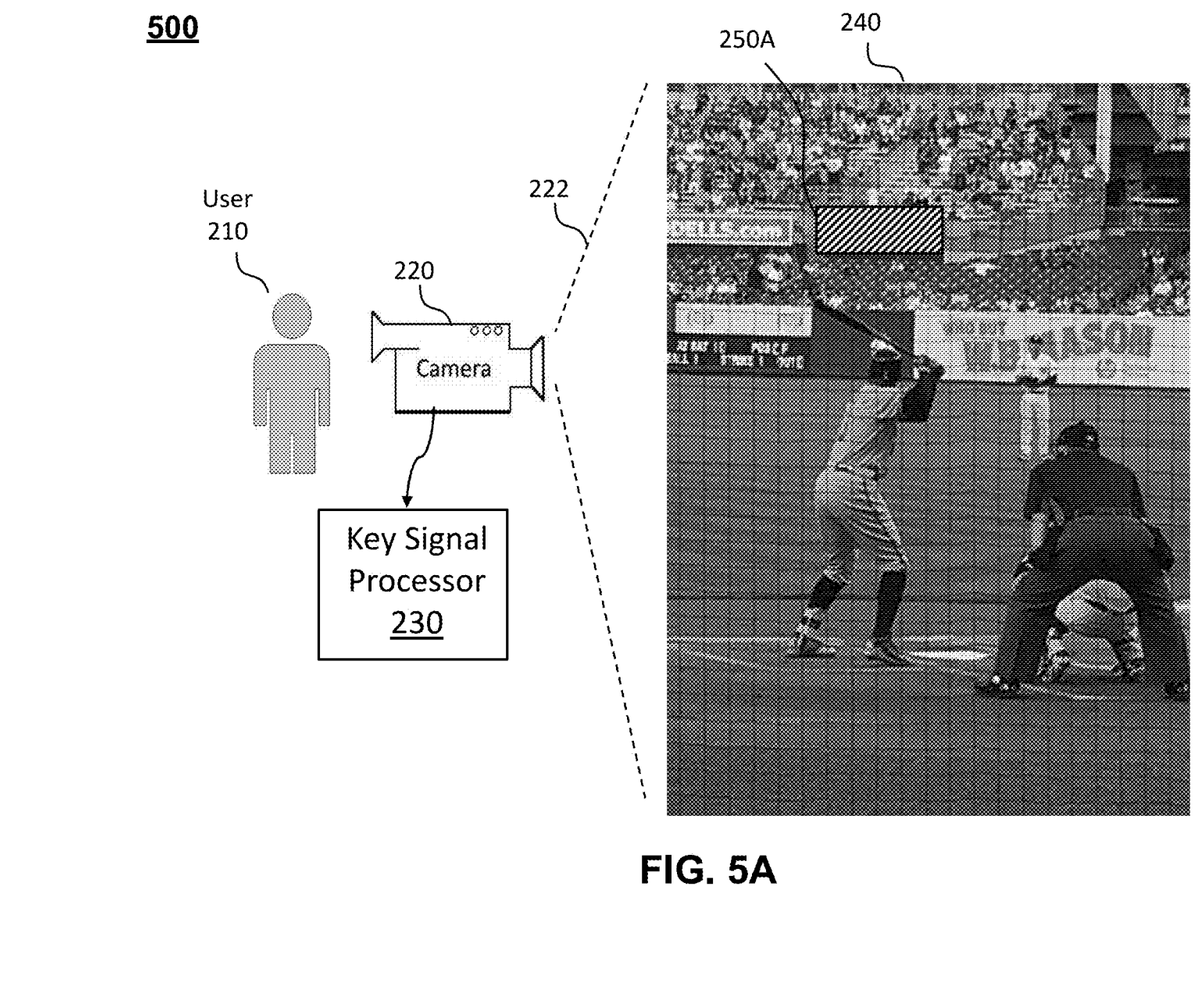
FIGS. 5A-5B illustrates a diagram of a system for capturing a key signal within video frames according to an exemplary embodiment.
Figure 5B:
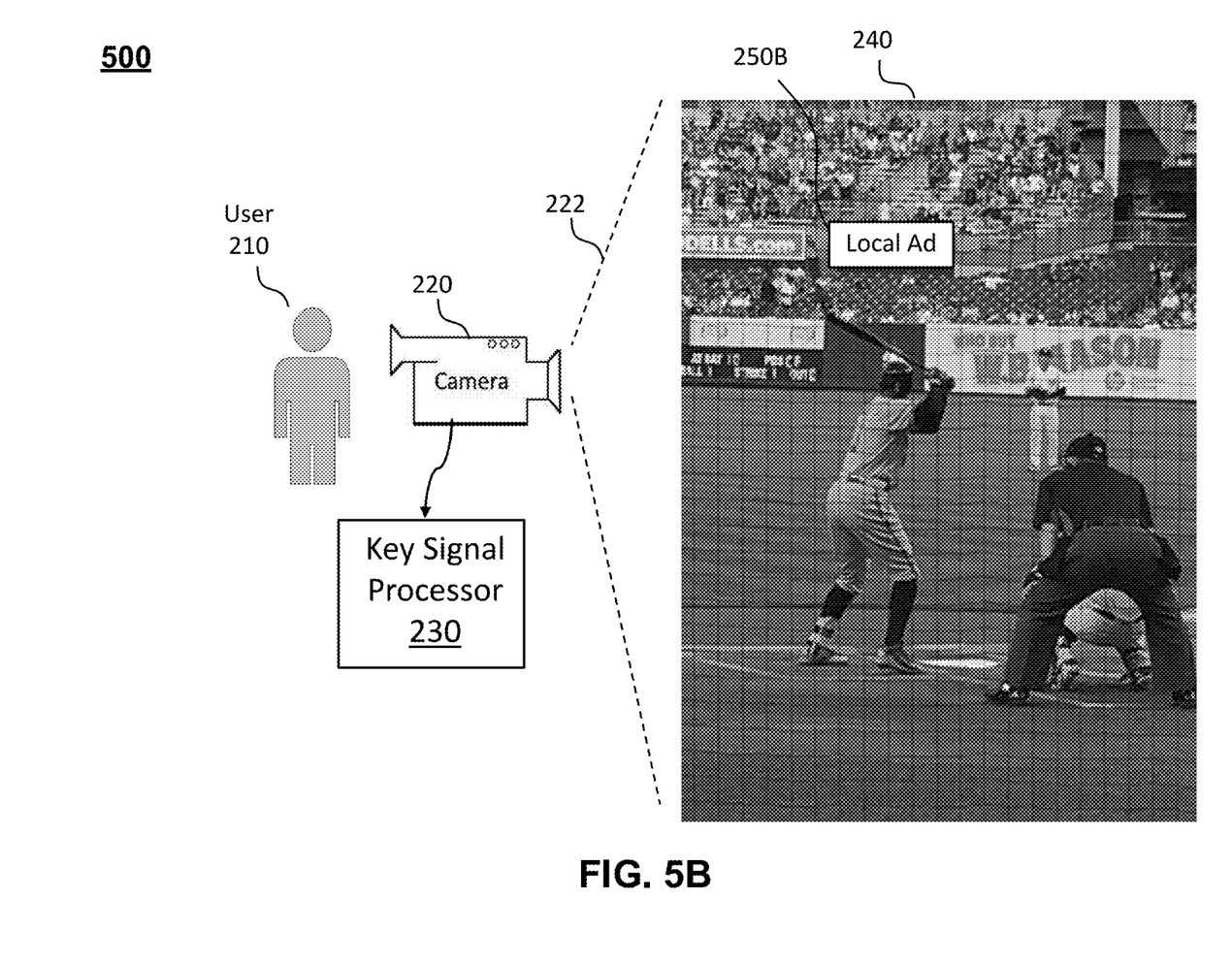

FIGS. 5A-5B illustrates a diagram of a system for capturing a key signal within video frames according to an exemplary embodiment. It is generally noted that the system 500 shown therein corresponds to the exemplary system shown above with respect to FIG. 2, and then same components using the same numbers will not be repeated herein. However, these figures show how the frame sequence of the electronic display 250 can switch between a green display and regular content.

In particular, in FIG. 5A, the electronic display 250A is flashing a green key frame that can correspond to green flash 414 as described above in the fame sequence 410. Moreover, FIG. 5B illustrates how the electronic display 250B displays the regular video content (e.g., a local ad targeted towards the stadium audience) and can correspond to any of frames 411, 412, 415, 416 and 417 as described above in the fame sequence 410. The camera 220, and in particular the pixel color detector 310 of the key signal processor 230, is configured to the key signal for each frame based on the chromaticity to output the decision as a key mask. As also described above, this key mask signal can be used to identify the pixels (i.e., the specific pixel location with the frame) that is within the field of view 222 that correspond to the electronic display 250. Moreover, downstream processor (e.g., as part of a video broadcast production) can insert (e.g., as an overlay) a targeted advertisement (or other content) in the pixels having a key mask of "1" value so that remote consumers of the video content will see a targeted advertisement that appears as if it was displayed at the original live scene at the venue. In other words, the pixels having a key mask of "1" will effectively define a location, such as a rectangular shape of display 250, in the image 240, which can then be replaced by the downstream processor with a new video or picture content.

Figure 6A:
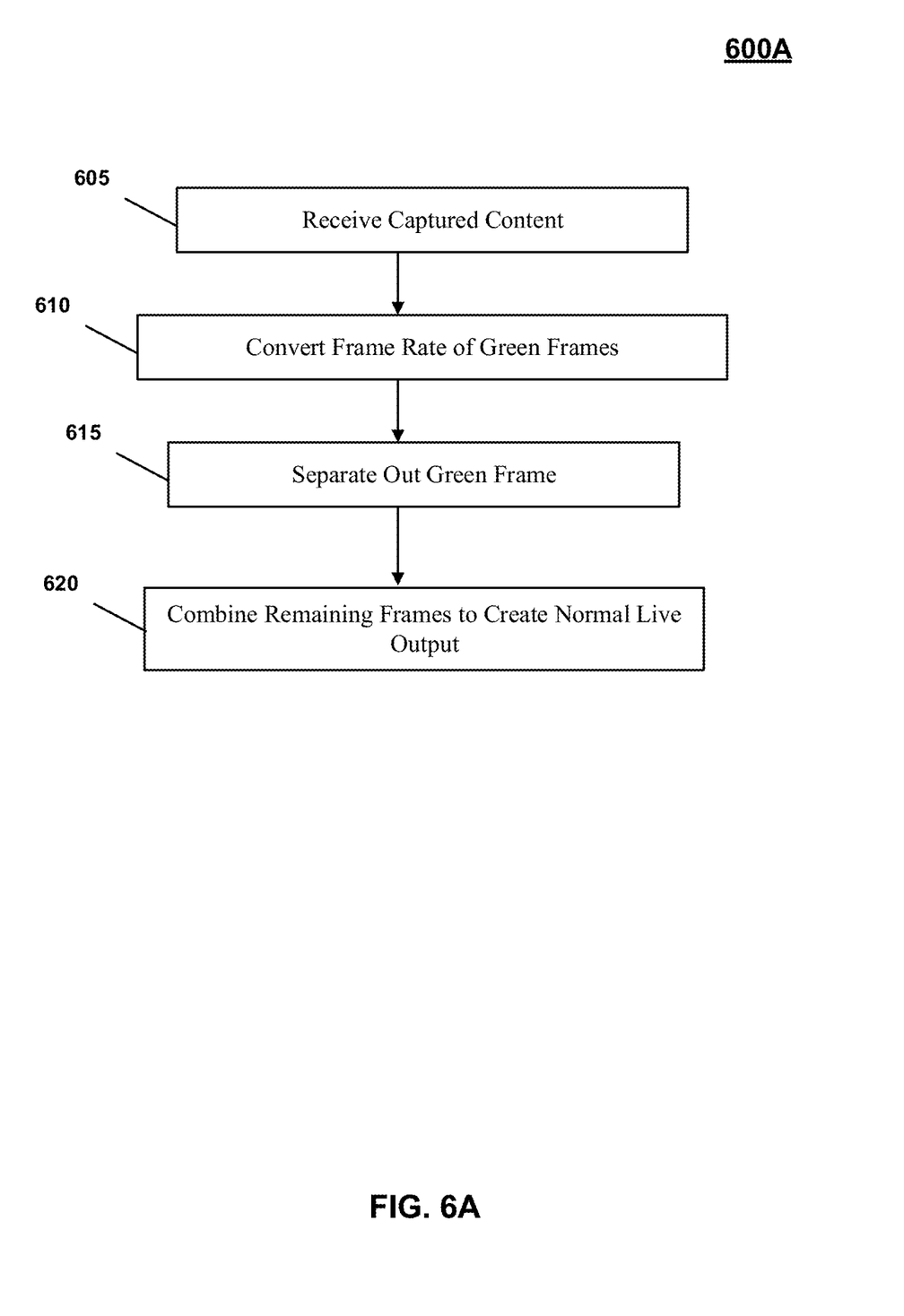
FIG. 6A-6B illustrate flowcharts for methods for capturing a key signal within video frames according to exemplary embodiments.

FIG. 6A illustrates a flowchart for a method 600A for capturing a key signal within video frames according to an exemplary embodiment. In general, the method 600 can be performed using the systems and components described above. As described above, the camera 220 is configured to capture frames of a live scene (e.g., at a sports venue) where the venue can include an electronic display 250 for displaying video content, such as an advertisement at a predetermined rate (e.g., 300 Hz).

As shown, the captured signal is provided to the key signal processor 230 at step 605. At step 610, the frame rate of the captured content is converted to the normal output of the camera. For example, if the normal frame rate is 50 Hz or 60 Hz outputs, then the key signal processor 230 can be configured to perform a clock rate conversion of the green frames, which may have a length of 3.3 milliseconds if the electronic display is operating at 300 Hz, to 20 milliseconds so as to provide the output as a 50 Hz signal. By converting the received signal to the lower frame rate, the six frames can be processed in parallel at a lower speed. Advantageously, at each moment within a frame, information from that pixel in previous frames is available.

Once the signal is converted to the normal (e.g., 50 Hz) frame rate, the key signal processor 230 is configured to determine which frames (and which pixels) contain the green display screen from the high frame rate stream (e.g., the electronic display 250) using the techniques described above. Once these green frames (e.g., key frames) are separated from the captured media content, the remaining frames can be combined to create a normal live output (e.g., output sequence 430 as shown in FIG. 4) at step 620.

Figure 6B:
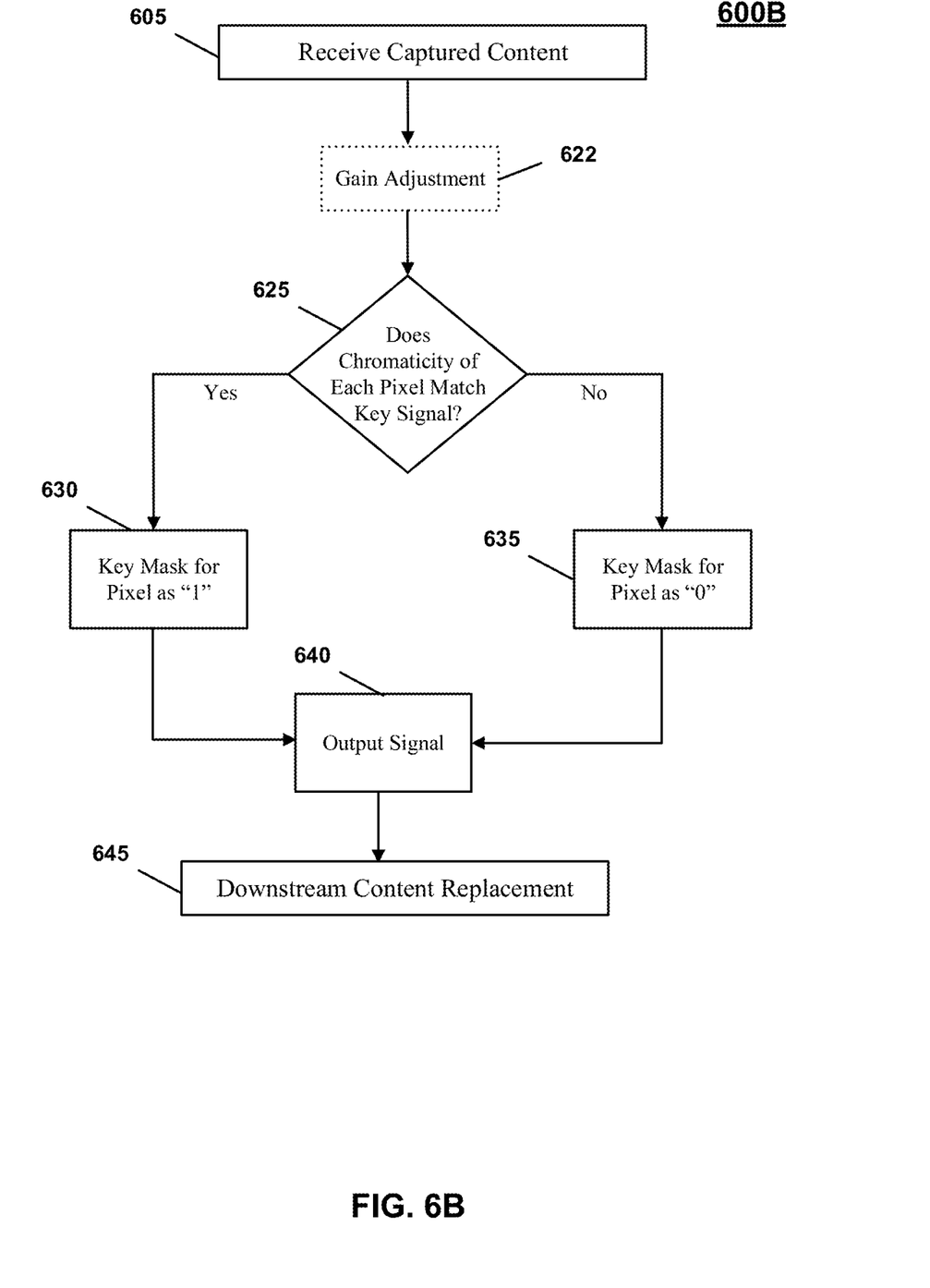

FIG. 6B illustrates a flowchart for a method 600B for capturing a key signal within video frames according to an exemplary embodiment. In general, the method 600B is a refinement of the exemplary method 600A shown above with step 605 corresponding to the receipt of captured media content by the key signal processor 230.

Upon receive of the captured signal, the method optionally includes a gain adjustment (as shown in a dashed boxes at step 622) where the gain corrector 315 can correct the received signal for the shorter integration time (due to its short exposure) before the mask signal is generated. Next, at step 625, the pixel color detector 310 determines for each pixel in each captured frame whether the pixel value has a certain chromaticity corresponding to, for example, the green (or blue) key frame signal. In either case, if the answer from processing step 625 is YES, the pixel color detector 310 outputs (at step 630) the decision as a key mask of a "1", which means that the key signal is a key color, such as green. If the answer from processing step 625 is NO, the pixel color detector 310 outputs (at step 635) the decision as a key mask of a "0", which means that the pixel corresponds to regular content, such as portions of the live scene 240 other than the electronic display 250.

At step 640, the key signal processor 230 is configured to output the signals for downstream keying. For example, the key signal output 320 can be configured to multiplex a one bit stream in the least significant bit of the blue (Cb in YCrCb) channel at step 630. This way, the camera 220 has to output only one stream by key signal output 320 to the production environment as described above. In another example, the output streams (e.g., output streams 430 and 440 as shown in FIG. 4) can be made available as independent video streams or as a video stream (combined output) plus an independent metadata stream.

Finally, at step 645, a downstream processing component (e.g., a remote production center) can use the data provided from the key mask to replace the pixels having a "1" key mask value with new content, such as a new advertisement targeted to a specific geographic region for example. The media production can then be broadcast to such end consumers of the content using conventional broadcasting and media distribution systems as known to those skilled in the art.

In one exemplary aspect, camera 220 (e.g., key signal output 320) is configured to output the (e.g., green) keying signal next to the normal frame rate output with the captured scene content 240. In this implementation, the key-frame, which is captured in a very short time as described above, is extended in time (e.g., converted to a lower clock frequency) and will be used to make it a second normal frame rate output. Thus, the camera 220 can be configured to provide a normal output (e.g., output signal 420 of FIG. 4) together with a key signal (e.g., output signal 430 of FIG. 4) that can be used with an external keyer to replace in the captured scene the content of display(s) by alternative content.

It should be appreciated that the key mask can be output as various types of output signals for processing by the downstream keyer. Thus, in another exemplary aspect, the (e.g., green) key signal of the first implementation is not output as a separate stream, but added as a 0:2:2 stream to the 4:2:2 stream of the production output to generate one 4:4:4 output. Alternatively, the key bit can be output as a separate metadata stream.

Yet further, a key signal can also be created for each pixel consisting of more than one bit. For each pixel value, the pixel color detector (e.g., a color detection circuit) can be configured to create a two bits value, where the first bit indicates whether the key color has been detected and the second bit border information to enable the keyer to more accurately determine the pixel location of the electronic display 250 within the captured content 240. Other extension that would be appreciated to those skilled in the state of the art of keying can be implemented inside the camera 220, reusing the basic principle as described above.

Finally, in yet another implementation of the exemplary embodiment, the key bit is added as the MSB in 12 bit values, so the key bit can survive external compression schemes, for example. In that case, green and red have regular 12 bit values, while blue uses 11 bit values and will have to get a 0.5× gain inside the camera 220 (e.g., by gain corrector 315), and a 2× gain outside the camera 220.

Figure 7:
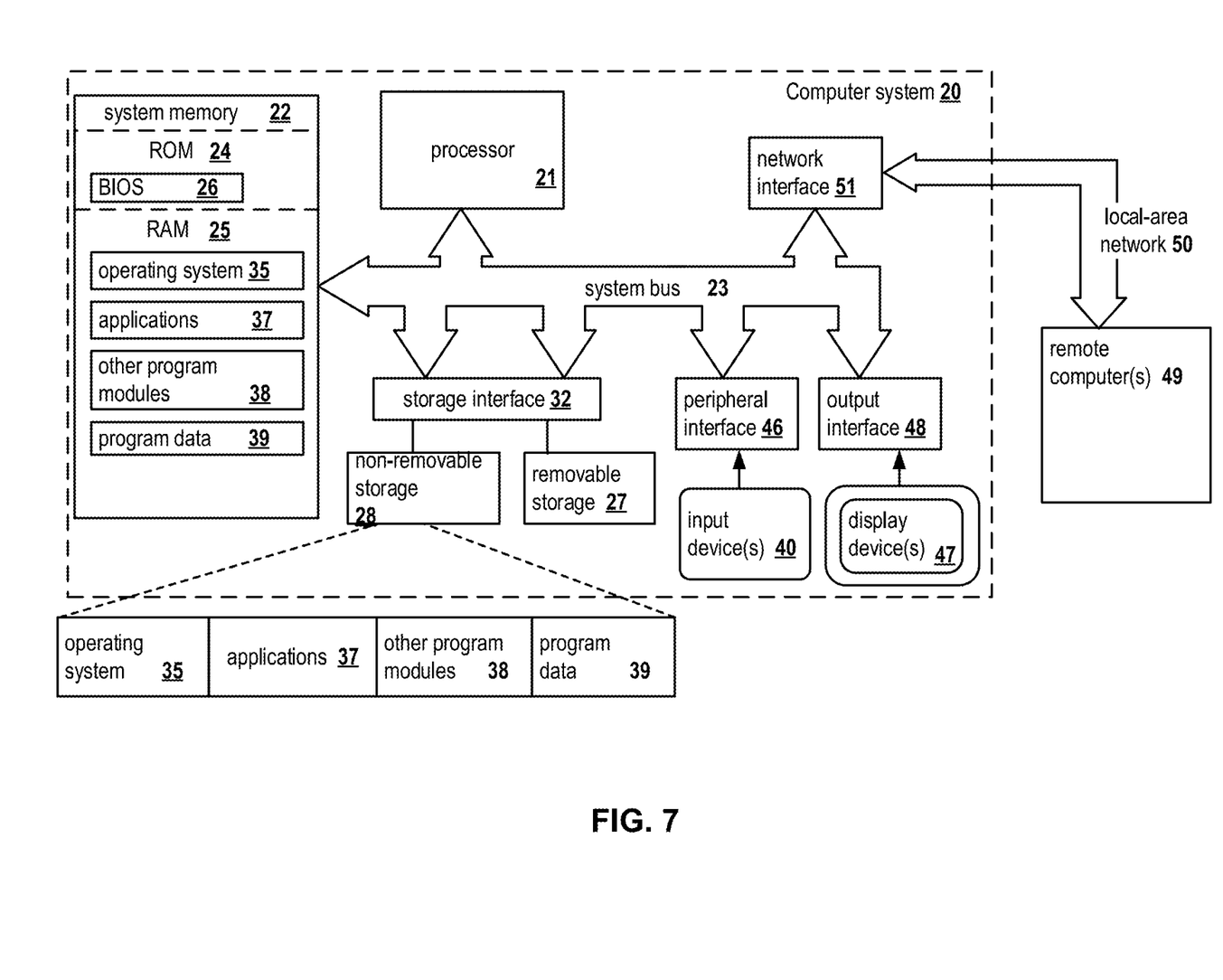
FIG. 7 is a block diagram illustrating a computer system on which aspects of systems and methods for capturing a key signal within video frames according to an exemplary embodiment.

FIG. 7 is a block diagram illustrating a computer system on which aspects of systems and methods for capturing a key signal within video frames according to an exemplary embodiment. In general, it should be noted that the computer system 20 can correspond to any computing system configured for the key signal processor 230 or any components therein. Although the computer system 20 is preferably a processing system within camera 220, it is noted that the exemplary embodiment for key signal detection can be downstream and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable codes implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Moreover, the remote computer (or computers) 49 can correspond to any one of the downstream devices for processing the data streams as described herein.

Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet (e.g., Internet 103). Examples of the network interface 51 may include an Ethernet interface, a Frame Relay interface, SONET interface, and wireless interfaces.

In general, it is noted that the exemplary aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed:

1. A system for capturing a key signal within video frames, the system comprising:
    a camera configured to capture a sequence of media content of a live scene that includes an electronic display having a higher frame rate than an output frame rate of the camera; and
    a key signal processor configured to:
        convert all frames in the sequence of media content to the output frame rate of the camera,
        analyze a sequence of frames of the captured media content to determine the key signal based on the electronic display outputting a sequence of frames including media content and at least one key frame included in the sequence, and
        combine remaining frames of the sequence of frames to create a live output signal, wherein the remaining frames do not include the at least one key frame from the sequence of frames,
    wherein the key signal processor includes a pixel color detector configured to determine, for each pixel in each frame in the sequence of frames, whether the pixel has a set chromaticity, and to generate a key mask for each pixel in each frame, with the key mask indicating whether the pixel comprises the key frame.

2. The system of claim 1, wherein the key signal processor includes a gain corrector configured to correct the at least one key frame.

3. The system of claim 1, wherein the key signal processor includes a key signal output configured to multiplex a one bit stream of the key frame in a least significant bit of a blue channel, such that the key signal and the media content are output as a single data stream.

4. The system of claim 1, wherein the key signal processor includes a key signal output that is configured to multiplex the live output signal with a metadata stream of the at least one key frame at the converted frame rate.

5. The system of claim 1, wherein the electronic display is configured to insert a key color frame as the key signal in the sequence of media content, with the key color frame being inserted at a frequency configured such that a human viewer of the sequence of media content cannot detect the key color frame.

6. The system of claim 1, wherein the key mask configures a downstream keyer to create a key and replace the respective pixels having the key frame in the sequence of frames with additional media content.

7. The system of claim 6, wherein the key signal processor includes a pixel color detector that is configured to create a two bits value, with a first bit indicating whether a key color has been detected and a second bit indicating border information to enable the downstream keyer to determine a location of the respective pixel in the electronic display within the captured media content.

8. The system of claim 1, wherein the key frame in the sequence of frames is positioned in a middle of the sequence of frames between frames of the media content.

9. The system of claim 1, further comprising:
a memory,
wherein the key signal processor is configured to implement instructions on the memory so as to provide:
a frame rate capture adjustor configured to convert all frames in the sequence of media content to the output frame rate of the camera,
the pixel color detector configured to analyze the sequence of frames of the captured media content to determine the key signal based on the electronic display outputting the sequence of frames including the media content and the at least one key frame included in the sequence, and
the key signal output configured to combine the remaining frames of the sequence of frames to create the live output signal, wherein the remaining frames do not include the at least one key frame from the sequence of frames.

10. A system for capturing a key signal within video frames, the system comprising:
a memory; and
a key signal processor configured to implement instructions on the memory so as to provide:
convert frames in a sequence of media content of a live scene captured by a camera to an output frame rate of the camera, with the live scene including an electronic display having a higher frame rate than the output frame rate of the camera;
analyze a sequence of frames of the captured media content to determine the key signal based on the electronic display outputting a sequence of frames including media content and at least one key frame included in the sequence; and
combine remaining frames of the sequence of frames to create a live output signal, wherein the remaining frames do not include the at least one key frame from the sequence of frames.

11. The system of claim 10, wherein the key signal processor includes a pixel color detector configured to determine, for each pixel in each frame in the sequence of frames, whether the pixel has a set chromaticity, and to generate a key mask for each pixel in each frame, with the key mask indicating whether the pixel comprises the key frame.

12. The system of claim 11, wherein the key mask configures a downstream keyer to create a key and replace the respective pixels having the key frame in the sequence of frames with additional media content.

13. The system of claim 12, wherein the key signal processor includes a pixel color detector that is configured to create a two bits value, with a first bit indicating whether a key color has been detected and a second bit indicating border information to enable the downstream keyer to determine a location of the respective pixel in the electronic display within the captured media content.

14. The system of claim 10, further comprising a gain corrector configured to correct the at least one key frame.

15. The system of claim 10, wherein the key signal processor includes a key signal output configured to multiplex a one bit stream of the key frame in a least significant bit of a blue channel, such that the key signal and the media content are output as a single data stream.

16. The system of claim 10, wherein the key signal processor includes a key signal output that is configured to multiplex the live output signal with a metadata stream of the at least one key frame at the converted frame rate.

17. The system of claim 10, wherein the electronic display is configured to insert a key color frame as the key signal in the sequence of media content, with the key color frame being inserted at a frequency configured such that a human viewer of the sequence of media content cannot detect the key color frame.

18. The system of claim 10, wherein the key frame in the sequence of frames is positioned in a middle of the sequence of frames between frames of the media content.

19. A system for capturing a key signal within video frames, the system comprising:
means for converting frames in a sequence of media content of a live scene captured by a camera to an output frame rate of the camera, with the live scene including an electronic display having a higher frame rate than the output frame rate of the camera;
means for analyzing a sequence of frames of the captured media content to determine the key signal based on the electronic display outputting a sequence of frames including media content and at least one key frame included in the sequence, and
means for combining remaining frames of the sequence of frames to create a live output signal, wherein the remaining frames do not include the at least one key frame from the sequence of frames.

20. The system of claim 19, further comprising means for determining, for each pixel in each frame in the sequence of frames, whether the pixel has a set chromaticity, and means for generating a key mask for each pixel in each frame, with the key mask indicating whether the pixel comprises the key frame.

* * * * *